(12) United States Patent
Brown et al.

(10) Patent No.: US 7,257,904 B1
(45) Date of Patent: Aug. 21, 2007

(54) KINGPIN INSPECTION GAUGE AND HITCH ADJUSTMENT TOOL

(75) Inventors: Eugene Brown, Odenville, AL (US);
Tom Moulton, Birmingham, AL (US);
Danny Henderson, Tarrant, AL (US)

(73) Assignee: Fontaine International, Birmingham, AL (US)

(*) Notice: Subject to any disclaimer, the term of this patent is extended or adjusted under 35 U.S.C. 154(b) by 0 days.

(21) Appl. No.: 11/043,342

(22) Filed: Jan. 26, 2005

(51) Int. Cl.
*G01B 3/14* (2006.01)
*B25F 1/00* (2006.01)

(52) U.S. Cl. .................. 33/562; 33/600; 33/1 BB; 7/138; 7/164; 81/484

(58) Field of Classification Search ............ 33/562, 33/563, 566, 613, 645, 501.45, 501.08, 501.09, 33/501.05, 600, 555.2, 1 B, 1 BB; D10/64, D10/61, 62; 7/138, 164, 150, 151, 119, 169, 7/100; 81/3.4, 3.09, 484, DIG. 5
See application file for complete search history.

(56) References Cited

U.S. PATENT DOCUMENTS

| | | | | |
|---|---|---|---|---|
| 165,671 A | * | 7/1875 | Hagerty | 7/138 |
| 184,775 A | * | 11/1876 | Gray | 7/138 |
| 363,331 A | * | 5/1887 | Hammer | 7/138 |
| 506,832 A | * | 10/1893 | Schofield | 7/138 |
| 1,267,265 A | * | 5/1918 | Pignani | 7/143 |
| 1,377,238 A | * | 5/1921 | Williams | 33/562 |
| 1,689,585 A | * | 10/1928 | Haschart | 81/125.1 |
| D174,896 S | * | 6/1955 | Carter et al. | D8/17 |
| D184,845 S | * | 4/1959 | Zahariades et al. | D10/64 |
| 3,686,770 A | * | 8/1972 | Davis | 33/193 |
| 3,931,749 A | * | 1/1976 | Evans | 81/119 |
| 4,103,378 A | * | 8/1978 | Granados | 7/138 |
| D273,467 S | * | 4/1984 | Martin | D10/64 |
| D278,691 S | * | 5/1985 | Sorrell | D10/64 |
| D340,874 S | * | 11/1993 | Nicholson | D10/64 |
| D429,654 S | * | 8/2000 | Pochurek | D10/64 |
| 6,886,266 B2 | * | 5/2005 | Kidd et al. | 33/608 |
| 7,040,034 B2 | * | 5/2006 | Nielson et al. | 33/666 |
| 7,073,272 B1 | * | 7/2006 | Lefebvre | 33/600 |

* cited by examiner

Primary Examiner—Christopher W. Fulton
Assistant Examiner—Amy R. Cohen
(74) Attorney, Agent, or Firm—Lanier Ford Shaver & Payne P.C.; George P. Kobler

(57) ABSTRACT

A tool for inspecting a trailer kingpin and adjusting a fifth wheel hitch includes a plate having at least two mutually substantially perpendicular sides, one side having upper and lower generally rectangular tabs extending therefrom and separated by a space therebetween, the space being dimensioned to snugly receive a kingpin lower flange, the upper tab being dimensioned to be snugly received along a kingpin shank. Opposing this tabbed side is a side having at least one shaped recess for receiving a means for adjusting play in a fifth wheel hitch and transferring the application of torque thereto. The plate also includes a shaped aperture for receiving a kingpin, the shaped aperture having a substantially rectangular wide portion and a substantially rectangular narrow portion.

7 Claims, 4 Drawing Sheets

KINGPIN INSPECTION GAUGE AND HITCH ADJUSTMENT TOOL

BACKGROUND

Description of the Related Art

Fifth wheel hitches are well known in the field of towing trailers using a truck or tractor. FIGS. 1A through 1C depict an exemplary tractor and trailer hitch arrangement employing a fifth wheel hitch. Tractor 100 is affixed with a fifth wheel hitch 103 to rear of tractor frame 105.

Fifth wheel hitch 103 includes a fifth wheel hitch assembly 110 pivotally mounted on pedestal 155. Fifth wheel hitch assembly 110 comprises hitch plate 130 with slot 135 opening toward the aft end of fifth wheel assembly 110 for receiving a kingpin 111 from trailer 119. Kingpin 111 typically extends from a trailer bearing plate 107, which rests upon fifth wheel assembly, specifically, upon load area 145 of fifth wheel hitch plate 130. Kingpin is, typically, a unitarily constructed article comprised of a lower flange 115 capping a shank 113 which extends from collar 117.

The condition of the kingpin is a significant factor in the safe towing of trailers. Operations, however, necessarily result in degradation of the kingpin over time to a point where attempting to hitch using a degraded kingpin is unsafe. For example, most, if not all, kingpins used in the fifth wheel coupling are designed to be used when plumb. If the kingpin is off from vertical by even one degree, effective coupling with the hitch may not be achieved and wear on the fifth wheel lock is accelerated.

Further, a worn kingpin, either in the collar area or in the shank results in excessive play between the kingpin and the fifth wheel locking mechanism. Many fifth wheel hitches include means by which the play may be reduced in the locking area. But if the kingpin is worn beyond a certain maximum amount, adjusting to decrease the play becomes ineffective in preventing a loose coupling.

The Society of Automotive Engineers (SAE) has promulgated standards for the safe configuration and condition of kingpins in SAE 700 which details the points to be checked during a pre-operation inspection of the kingpin. In addition to checking for mounting and wear, the operator should examine the kingpin to see if it extends the proper length from the trailer bearing plate and that the lower flange is of specified size to prevent disengagement of the kingpin from the fifth wheel jaws.

A gauge can be used to aid an operator's inspection of the kingpin for plumb, excessive wear and proper length. Such a gauge has been disclosed in U.S. Design Pat. No. Des. 273, 467, issued to Martin on Apr. 17, 1984. However, an operator, to properly achieve effective coupling of the trailer to the hitch must use other tools to adjust the hitch, for example a wrench. A separate gauge, thus, adds to the number of implements an operator must have on hand.

SUMMARY

The present disclosure is directed to a tool for adjusting a fifth wheel hitch coupling that advantageously incorporates a gauge for inspection of the kingpin.

For purposes of summarizing the invention, certain aspects, advantages, and novel features of the invention have been described herein. It is to be understood that not necessarily all such advantages may be achieved in accordance with any one particular embodiment of the invention. Thus, the invention maybe embodied or carried out in a manner that achieves or optimizes one advantage or group of advantages as taught herein without necessarily achieving other advantages as may be taught or suggested herein.

A tool for inspecting a trailer kingpin and adjusting a fifth wheel hitch includes a plate having at least two mutually substantially perpendicular sides, one side having upper and lower generally rectangular tabs extending therefrom and separated by a space therebetween, the space being dimensioned to snugly receive a kingpin lower flange, the upper tab being dimensioned to be snugly received along a kingpin shank. Opposing this tabbed side is a side having at least one shaped recess for receiving a means for adjusting play in a fifth wheel hitch and transferring the application of torque thereto. The plate also includes a shaped aperture for receiving a kingpin, the shaped aperture having a substantially rectangular wide portion and a substantially rectangular narrow portion.

In a further embodiment, the tool includes more than one shaped recess for the application of torque to the fifth wheel adjustment means.

In a still further embodiment, the wide portion of the aperture includes two widths with a transitional region in between. Likewise, the narrow portion of the aperture includes two widths with a transitional region in between.

In yet another embodiment, the region of the plate surrounding the shaped recess, or recesses, is thicker than the remaining portions of the plate.

These and other embodiments of the present invention will also become readily apparent to those skilled in the art from the following detailed description of the embodiments having reference to the attached figures, the invention not being limited to any particular embodiment(s) disclosed.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

The various embodiments of the present invention and their advantages are best understood by referring to FIGS. 1 through 4 of the drawings. The elements of the drawings are not necessarily to scale, emphasis instead being placed upon clearly illustrating the principles of the invention. Throughout the drawings, like numerals are used for like and corresponding parts of the various drawing.

This invention maybe provided in other specific forms and embodiments without departing from the essential characteristics as described herein. The embodiments described above are to be considered in all aspects as illustrative only and not restrictive in any manner. The following claims rather than the foregoing description indicate the scope of the invention.

Figure 1A:
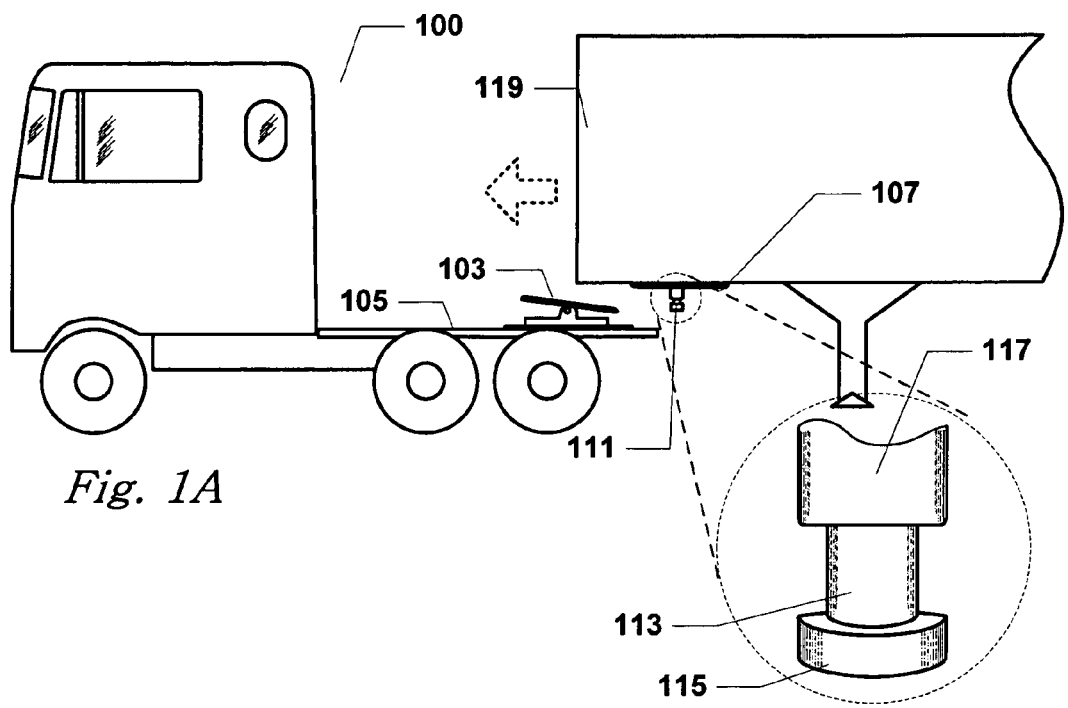
FIG. 1A is a illustration of a tractor and trailer coupling using a fifth wheel hitch.
Figure 1B:
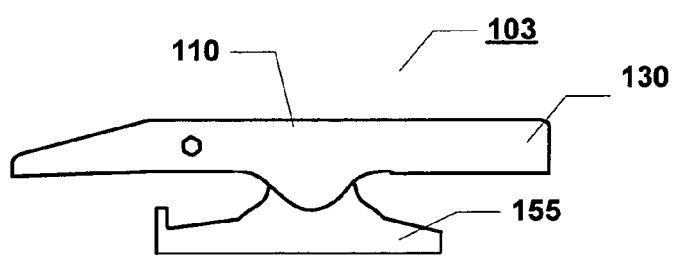
FIG. 1B depicts an exemplary fifth wheel hitch.
Figure 1C:
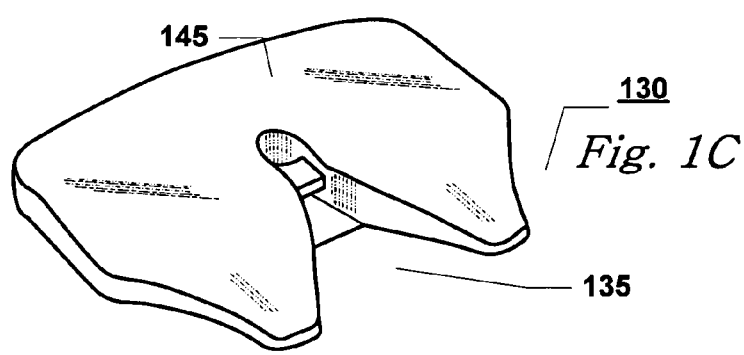
FIG. 1C is a perspective view of an exemplary fifth wheel hitch plate.
Figure 2A:
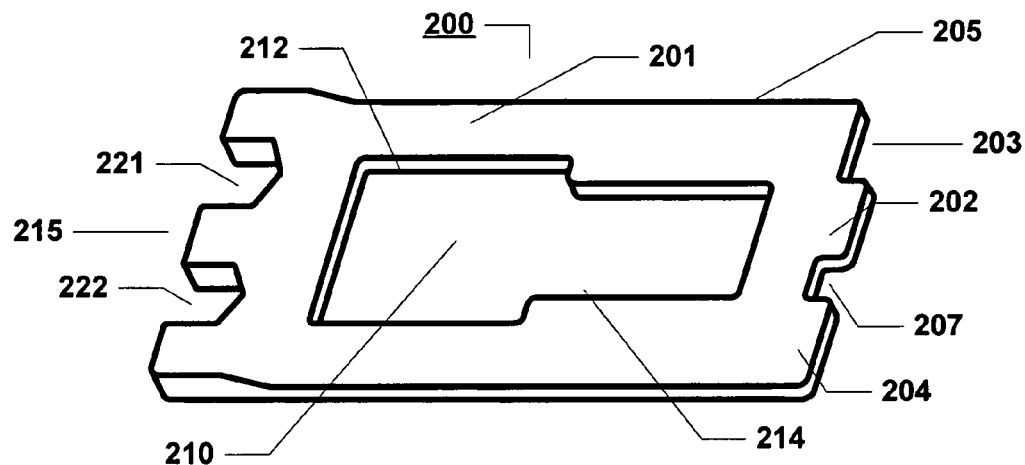
FIG. 2A is a perspective view of a kingpin tool according to one embodiment of the present invention.
Figure 2B:
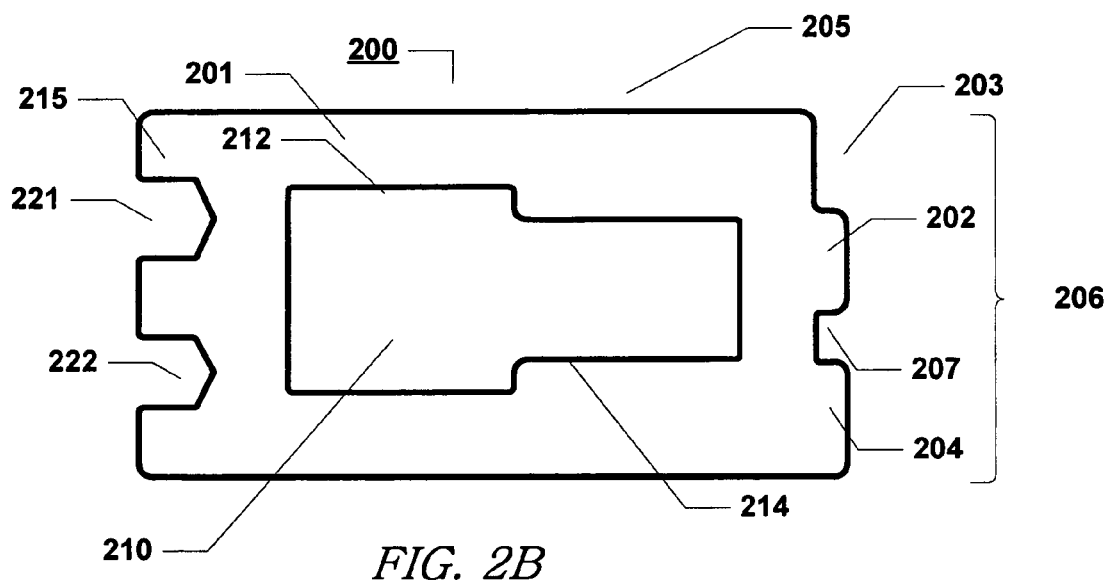
FIG. 2B is a plan view of the inventive kingpin tool according to one embodiment of the present invention.

FIGS. 2A and 2B depict one exemplary embodiment of the tool 200 according to the present invention displaying a plate 201 having a first side 206 that is substantially perpendicular to an adjacent side 205. Extending from first side 206 are tabs 202, 204 which are separated by space 207. Tabs 202, 204 are substantially rectangular having an outward edge perpendicular to adjacent side 205.

Tool 200 incorporates aperture 210 which is a diameter gauge for a kingpin. Aperture 210 is shaped to have a relatively wider portion 212 and a relatively narrow portion 214. Formed in a side 215 opposing first side 206, are one or more open-end wrench spaces 221, 222. Where there are two or more open wrench spaces 221, 222, each such space maybe of a differing size.

Figure 3A:
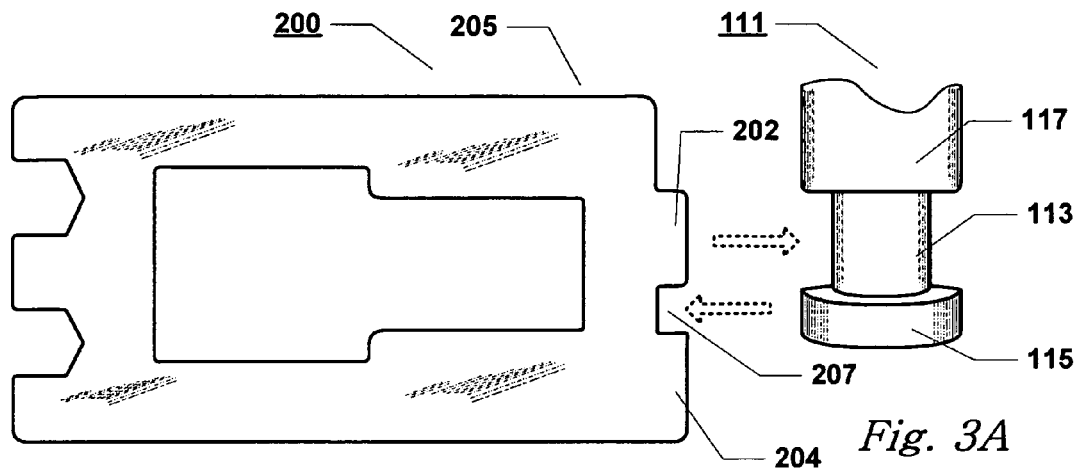
FIG. 3A is an illustration of the use of a plumb gauging portion of the kingpin tool according the present invention.
Figure 3B:
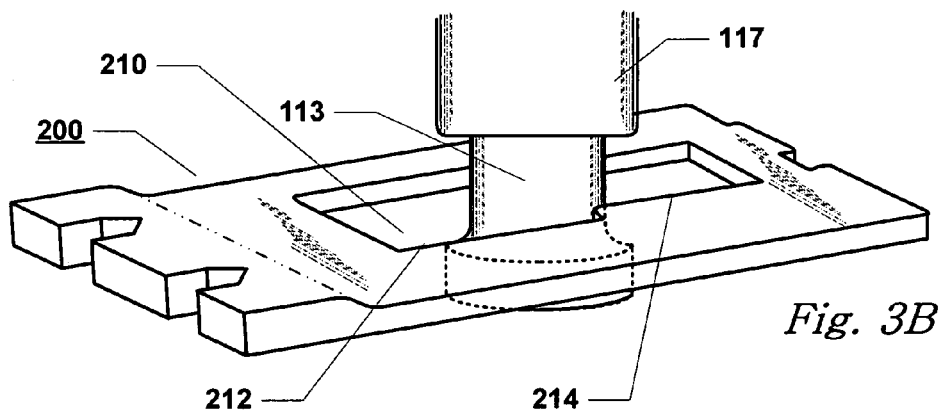
FIG. 3B is an illustration of the use of a wear gauging portion of the kingpin tool according to the present invention.

Use of the gauge portion of tool 200 is shown in FIGS. 3A and 3B. In FIG. 3A, tool 200 is oriented to be on edge with respect to ground, and tabs 202, 204 positioned toward exemplary kingpin 111. Upper tab 202 is seated against kingpin shank 113, with space 207 receiving kingpin lower flange 115. Kingpin collar 117 rests against the recessed area of first side 203. Adjacent side 205 placed abutting upper fifth wheel assembly which is mounted to trailer (not shown). Thus, a visual indication of whether the kingpin is plumb may be obtained as a result of the edge of tab 202 being perpendicular with adjacent side 205.

It should be noted that upper tab 202, space 207 and lower tab 204 are disposed along first side 206 so as to leave an area along the side corresponding to the length of collar 117. This is so that when the gauge is seated against kingpin and the trailer bearing plate, proper length of the kingpin may also be observed and assessed.

The diameter of kingpin collar 117 and shank 113 is checked by placing tool 200 over kingpin 111, with kingpin 111 inserted through aperture 210, as shown in FIG. 3B. Wide portion 212 is of a width that is equal to the diameter of collar 117 less the maximum amount of wear of one-eighth inch. Thus, if collar 117 fits inside wide portion 212, it is beyond the maximum wear limits and must be replaced. Likewise, narrow portion 214 is of a width that is equal to shank 113 less the maximum amount of wear of one-eighth inch. To check the shank for maximum wear, the inspector attempts to position the narrow portion 214 around the shank. If shank 113 fits inside narrow portion 214, it is beyond the maximum wear limits and must be replaced.

Figure 4:
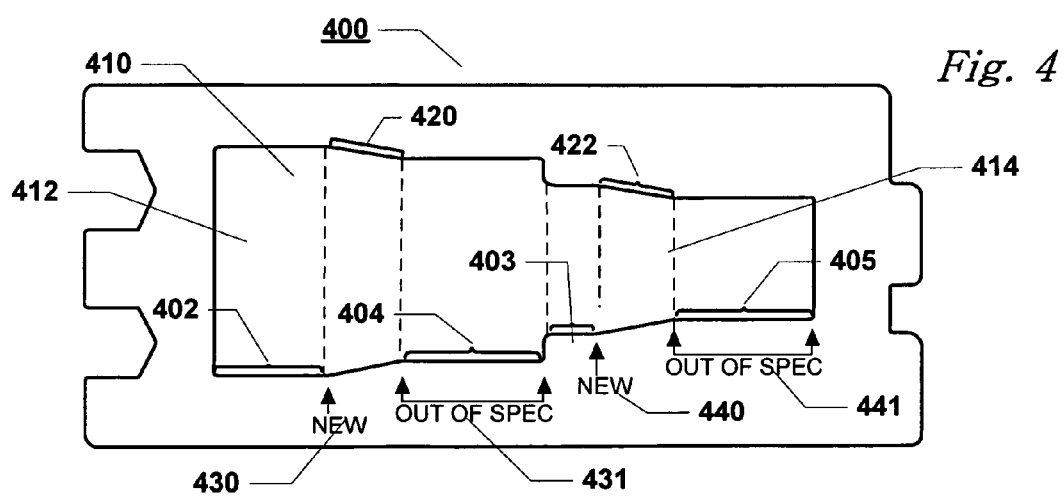
FIG. 4 is a plan view of the kingpin tool according to an alternative embodiment of the present invention.

FIG. 4 shows an exemplary alternative embodiment of the inventive tool 400 wherein aperture 410 comprises a wide portion 412 and a narrow portion 414. Wide portion 412 is composed of a sub-portion of a first width 402 transitioning relatively gradually, through a first transitional region 420, to a sub-portion of a second width 404. Likewise, narrow portion 414 is composed of a sub-portion of a third width 403 transitioning relatively gradually, through a second transitional region 422, to a sub-portion of a fourth width 405.

Wide portion 412 is again used to gauge the wear on kingpin collar 117 by placing tool 400 over kingpin 111, with kingpin inserted through aperture. In this embodiment, the first width 402 is slightly wider than the diameter of an unworn kingpin collar 117, and second width 404 is substantially equal to that diameter less the maximum wear allowed by applicable governing standards (e.g., one-eighth inch). Thus, if collar 117 fits within second width 404, the wear is greater than the maximum allowed and the kingpin must be replaced. However, unlike the previously discussed embodiment, first transitional region 420 provides a visual indication of the progress of wear on collar 117 and gives an operator the option of exchanging a worn kingpin for an unworn kingpin prior to wear exceeding limits. In addition, tool 400 may be imprinted, engraved or embossed with indicia 430, 431 to provide further visual explanation of whether collar 117 has worn beyond acceptable limits 431, or is yet usable 430.

Narrow portion 414 is a gauge of wear on kingpin shank 113 by placing kingpin 111 through wide portion 412 of aperture 410 and positioning tool 400 so that shank 113 is inserted through third width 403. Third width 403 is slightly wider than the diameter of an unworn shank 113, and fourth width 405 is substantially equal to that diameter less the maximum wear allowed by applicable governing standards (e.g., one-eighth inch). Thus, if shank 113 fits within fourth width 405, the wear is greater than the maximum allowed and the kingpin must be replaced. Like first transitional region, second transitional region 422 provides a visual indication of the progress of wear on shank 113 and permits an operator to decide to change the worn kingpin out prior to the wear actually exceeding limits. Again, tool 400 may be imprinted, engraved, or embossed with indicia 440, 441 to provide further visual explanation of whether shank 113 is worn beyond acceptable limits 441, or remains in an operable condition 440.

Figure 5A:
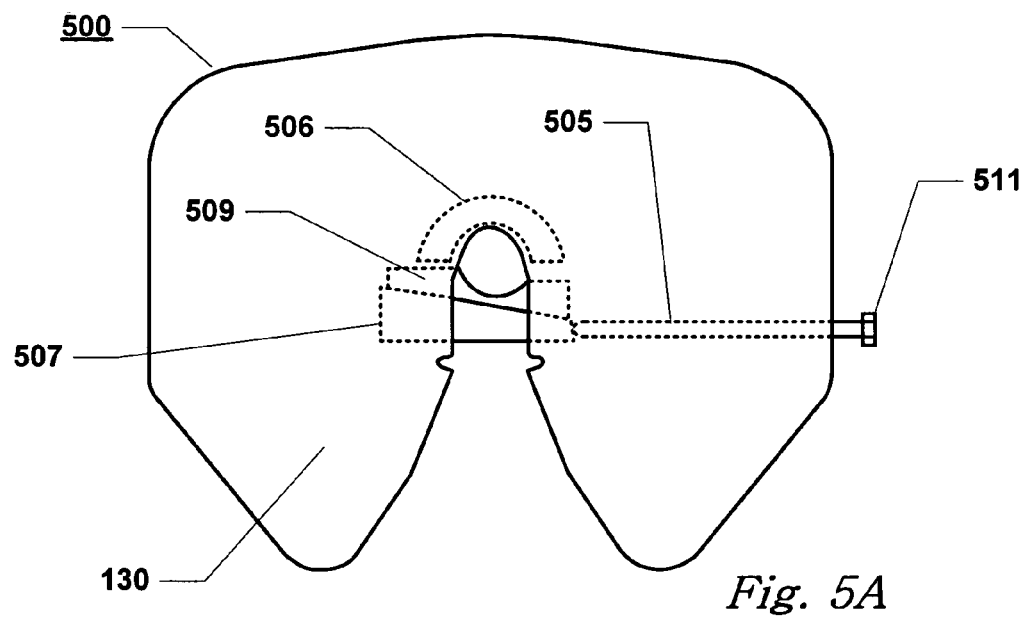
FIG. 5A is a plan view of an exemplary fifth wheel hitch plate illustrating exemplary locking and adjusting mechanisms.
Figure 5B:
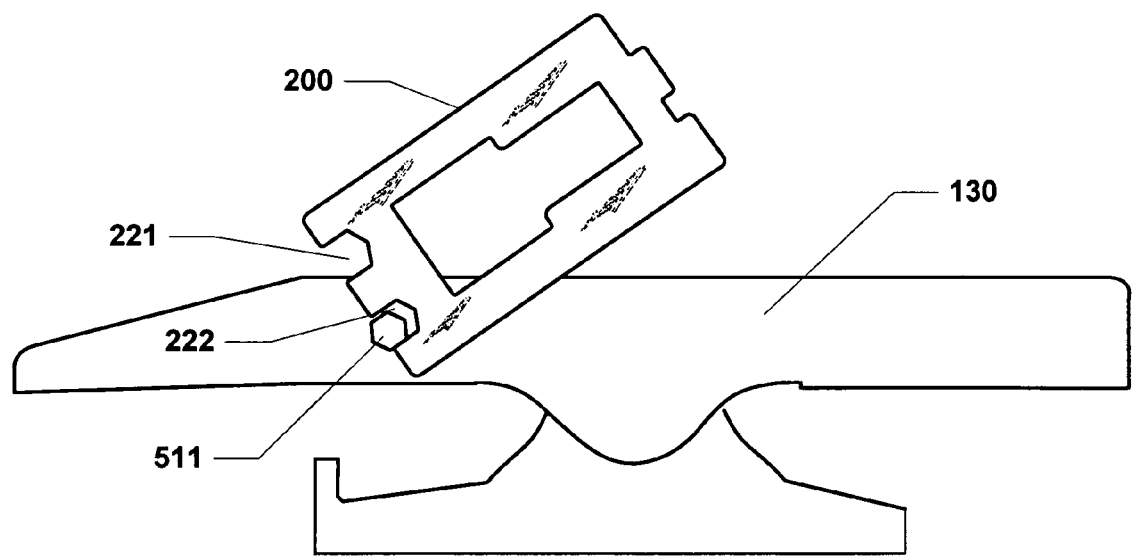
FIG. 5B is an illustration of the use of adjustment tool portion of the inventive kingpin tool according to one embodiment of the present invention.

Many fifth wheel assemblies comprise a means to vary the amount of space between the kingpin and the jaws of the fifth wheel, or "play" when the kingpin is engaged within the slot. Referring to FIG. 5, shown is a top view of an exemplary fifth wheel hitch assembly 500 incorporating an exemplary means is a threaded rod 505 extending to a wedge member 507 abutting a movable jaw member 509. During coupling operation, movable jaw member 509 receives a kingpin and holds it against fixed jaw 506.

Rod 505 extends through the wall of fifth wheel hitch plate 130 and can be turned by application of torque to hexagonal cap 511. Rotation of hexagonal cap rotates threaded rod 505 which moves block 507 laterally inward or outward with respect to movable jaw member 509, thereby increasing or decreasing the play. This apparatus is more clearly described in greater detail in co-owned U.S. Pat. No. 5,641,174 issued Jun. 24, 1997, to Terry, et al. and incorporated by reference herein.

To advantageously decrease the number of implements an operator must have on hand, tool 200 comprises one or more open end wrench spaces 221, 222. When kingpin is engaged within fifth wheel, tool 200 may be used by simply placing wrench space over the hexagonal cap and applying torque thereto through leverage applied to tool 200. Wrench space(s) may be of any appropriate size to match the size of any hexagonal cap used. Non-limiting examples of sizes are one and one-sixteenth inch and fifteen-sixteenth inch, which are sizes found on many fifth wheel assembly systems.

The inventive tool disclosed hereinabove may be comprised of any suitable material including metals, metal alloys, and suitably durable and strong polymerics. It may be formed from casting or injection molding or other forms of manufacturing known in the arts. Thickness of tool maybe uniform, but where weaker materials are used, it is preferably thicker in the region of the wrench spaces, for example, twice that of the remainder of the tool, in order to support the application of torque. Whether the thickness of the region near the wrench spaces is thicker depends upon the material used as would be appreciated by those skilled in the relevant arts. A prototype has been formed using polypropylene with a thickness in the wrench space region of approximately 0.5 inches, and a thickness for the remainder of the tool of approximately 0.25 inches.

As described above and shown in the associated drawings, the present invention comprises an apparatus for a kingpin inspection gauge and fifth wheel adjustment tool. While particular embodiments of the invention have been described, it will be understood, however, that the invention is not limited thereto, since modifications maybe made by those skilled in the art, particularly in light of the foregoing teachings. It is, therefore, contemplated by the appended claims to cover any such modifications that incorporate those features or those improvements that embody the spirit and scope of the present invention.

We claim:

1. A tool for inspecting a trailer kingpin and adjusting a fifth wheel hitch, said kingpin comprising a lower flange and a shank, said hitch comprising a bolt having a hexagonal cap for adjusting the amount of play when a kingpin is engaged therein, said tool comprising a plate, said plate having:
    a. first and second mutually substantially perpendicular sides defining a plane, said first side having upper and lower generally rectangular tabs extending therefrom and separated by a space therebetween, said space being dimensioned to snugly receive a kingpin lower flange, said upper tab being dimensioned to be snugly received along said shank;
    b. a side opposing said first side, said opposing side having at least one recess shaped and dimensioned to receive said hexagonal cap for transferring the application of torque thereto;
    c. a shaped aperture therein for inserting therethrough a kingpin, said shaped aperture having a wide portion and a narrow portion, said wide and narrow portions being substantially rectangular; and
    d. an orthogonal thickness with respect to said plane, said thickness being substantially constant for most of the tool with respect to the tool length, and relatively greater in the area of said at least one shaped recess.

2. The tool of claim 1, wherein said at least one recess comprises first and second recesses, each of a different size, for receiving differently sized hexagonal caps.

3. The tool of claim 2, wherein said hexagonal cap is one of one-and-one sixteenth inches and fifteen sixteenth inches.

4. The tool of claim 1, wherein each of said wide and narrow portions of said aperture further comprises first and second widths, said second width being narrower than said first width, and a transitional region interposed therebetween.

5. The tool of claim 4, wherein said plate has a surface and further comprising indicia disposed upon said surface for indicating whether one of a collar diameter and a shank diameter of said kingpin is below a minimum diameter.

6. The tool of claim 5, wherein said at least one recess comprises first and second recesses, each of a different size, for receiving differently sized hexagonal caps.

7. The tool of claim 6, wherein said hexagonal cap is one of one-and-one sixteenth inches and fifteen sixteenth inches.

* * * * *